United States Patent
Donley et al.

(10) Patent No.: US 7,190,948 B2
(45) Date of Patent: Mar. 13, 2007

(54) AUTHENTICATION MECHANISM FOR TELEPHONY DEVICES

(75) Inventors: Christopher J. Donley, Longmont, CO (US); Tobert G. Shipley, Longmont, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 710 days.

(21) Appl. No.: 10/385,879

(22) Filed: Mar. 10, 2003

(65) Prior Publication Data

US 2004/0180646 A1 Sep. 16, 2004

(51) Int. Cl.
H04M 1/66 (2006.01)
H04M 11/00 (2006.01)
H04M 3/42 (2006.01)
H04Q 7/20 (2006.01)

(52) U.S. Cl. ............... 455/411; 455/404.2; 455/414.2; 455/456.1

(58) Field of Classification Search ............ 455/404.2, 455/410, 411, 414.2, 456.1
See application file for complete search history.

(56) References Cited

U.S. PATENT DOCUMENTS

| | | | |
|---|---|---|---|
| 4,993,068 A * | 2/1991 | Piosenka et al. ............ 713/186 |
| 5,428,663 A | 6/1995 | Grimes et al. |
| 6,067,621 A | 5/2000 | Yu et al. |
| 6,091,956 A * | 7/2000 | Hollenberg ............... 455/456.5 |
| 6,393,271 B1 * | 5/2002 | Dougherty ................. 455/411 |
| 6,493,550 B1 * | 12/2002 | Raith ....................... 455/422.1 |
| 6,883,095 B2 | 4/2005 | Sandhu et al. |
| 6,909,903 B2 * | 6/2005 | Wang ....................... 455/456.1 |
| H002120 H * | 7/2005 | Cudlitz ....................... 235/382 |
| 6,915,123 B1 * | 7/2005 | Daudelin et al. ........... 455/410 |
| 6,928,166 B2 | 8/2005 | Yoshizawa |
| 6,928,558 B1 | 8/2005 | Allahwerdi et al. |
| 6,934,848 B1 | 8/2005 | King et al. |
| 6,968,179 B1 * | 11/2005 | De Vries ................. 455/414.1 |
| 6,976,164 B1 | 12/2005 | King et al. |
| 6,987,948 B2 * | 1/2006 | Engstrom et al. .......... 455/41.1 |
| 7,016,666 B2 * | 3/2006 | Lauper et al. .............. 455/411 |
| 7,039,392 B2 * | 5/2006 | McCorkle et al. .......... 455/411 |
| 2002/0038422 A1 | 3/2002 | Suwamoto et al. |
| 2002/0112186 A1 | 8/2002 | Ford et al. |
| 2002/0194473 A1 | 12/2002 | Pope et al. |
| 2003/0144959 A1 | 7/2003 | Makita |
| 2004/0103324 A1 | 5/2004 | Band |
| 2004/0162998 A1 | 8/2004 | Tuomi et al. |

OTHER PUBLICATIONS

AD Tech Engineering, IP Phone SI-160 User Manual (SCCP releases) Version 1.2 (2002), pp. 1-20.

(Continued)

Primary Examiner—Bing Q. Bui
(74) Attorney, Agent, or Firm—Sheridan Ross P.C.

(57) ABSTRACT

The present invention is directed to a presence aware network 100 that includes a plurality of communication devices 124a–n and 128a–n, associated with a plurality of subscribers. Each communication device may be configured automatically according to a first set of preferences associated with a first subscriber when the first subscriber performs a telephony function on the communication device and according to a second set of preferences when a different second subscriber performs the telephony function on the communication device. The first and second sets of preferences are different from one another.

32 Claims, 5 Drawing Sheets

OTHER PUBLICATIONS

"The Cricket Indoor Location System: An NMS Project @ MIT LCS" at http://nms.lcs.mit.edu/projects/cricket (Jul. 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network with Smart Card Technology" available at www.datakey.com, pp. 1-8.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Vendor Wrapper Service Provider" at http://msdn.microsoft.com/library/en-us/security/security/vendor_wrapper_wrapper_service_provider.asp (Aug. 2002), pp. 1-2.

* cited by examiner

| SUBSCRIBER | ADDRESS | OTHER SUBSCRIBER(S) | REGISTRATION INFORMATION |
|---|---|---|---|
| 1111 | 2222 | 3333<br>4444 | 5555 |

AUTHENTICATION MECHANISM FOR TELEPHONY DEVICES

FIELD OF THE INVENTION

The present application is directed generally to network security and specifically to authentication in telephony environments.

BACKGROUND OF THE INVENTION

Authentication is rapidly becoming a critical issue in distributed processing networks in view of the increasing frequency of hacking and other security violations. Authentication refers generally to the process of verifying the identity of a user and/or a user's eligibility to access an object. A common way to authenticate a user in a computational environment is by the use of credentials.

Credentials refer to information that uniquely identifies a user. Credentials include not only fingerprints, retinal scans, facial thermography, and other biometrics but also unique sequences or patterns of numeric, alphabetical, and alphanumeric characters, such as digital certificates or keys, electromagnetic signatures, and smart cards. Credentials can also be used to transform or encrypt data into an unintelligible form in such a way that the original data either cannot be obtained or can be obtained only by using a decryption process.

A digital certificate is an electronic methodology for establishing your credentials from a remote location. It is issued by a certification authority. It typically contains your name, a serial number, an expiration date, the certificate holder's public key (used for encrypting messages and digital signatures), and the digital signature of the certificate-issuing authority. A digital certificate, in conjunction with cryptographic tools, uniquely identifies a specific user on the network, regardless of where the user is located or what application the user is using, in a reliable method.

Smart cards comprise embedded integrated circuits that store information in electronic form. Smart cards use personal identification numbers, biometrics, and encryption methods to authenticate a user. Smart cards communicate with an external reader, which can be a computer system, a cash register, or any other type of input device. The information stored on the smart card is accessed by the reader by either direct contact or wirelessly, such as by radio signals.

Against the backdrop of ever increasing network security measures being implemented in many computational environments, there are a number of network nodes connected directly or indirectly to the network that have weak or no security and can compromise the strong security measures in place in other nodes or network components. For example, Internet Protocol or IP hardware-controlled or IP hard phones and conventional digital phones have, at best, only limited security capabilities. Typically, when security is available it is nothing more than an extension number associated with a subscriber and a keypad-entered password that is limited to 12 characters (as opposed to a PC keyboard that has 96 ASCII values for each character) or a burned-in Media Access Control or MAC address. Twelve-character passwords are quickly and easily compromised using existing decoding algorithms. Moreover, the node itself is authenticated and not the subscriber.

There is an urgent need to address this issue, in view of not only increasing numbers of security violations but also the introduction of new protocols, such as 802.1X and the Session Initiation Protocol or SIP. The 802.1X protocol is a Layer 2 security protocol that requires a network node to perform authentication before enabling the node to access data. SIP, for effective tracking of presence, requires automated tracking of subscribers.

SUMMARY OF THE INVENTION

These and other needs are addressed by the various embodiments and configurations of the present invention. The present invention is directed generally to presence aware networks in which a communication device can simultaneously be associated with a plurality of subscribers and/or in which a proximity detector can be used to authenticate subscribers automatically to a common communication device. A "subscriber" refers to a person who is serviced by, registered or subscribed with, or otherwise affiliated with the presence aware network. Communication devices can be any type of communicating device, whether configured for circuit-switched or packet-switched networks, including, for example, IP hardphones such as the Cisco 7960™ phone, IP softphones, Personal Digital Assistants or PDAs, Personal Computers or PCs, laptops, pagers, facsimile machines, modems, and wired and wireless telephones.

In a first aspect of the present invention, a method for serving a plurality of communication devices associated with a plurality of subscribers is provided. The method includes the steps of:

(a) determining that first and second subscribers are in the vicinity (e.g., a predetermined range) of a selected communication device at least once during a defined time interval (e.g., a predetermined lifespan of a SIP registration by a subscriber or another type of association of a subscriber with the communication device address);

(b) providing first and second sets of preferences corresponding to the first and second subscribers to the selected communication device during the defined time interval, the first and second sets of preferences being different from one another; and (c) configuring (automatically) the selected communication device according to the first set of preferences when the first subscriber performs a telephony function and according to the second set of preferences when the second subscriber performs the telephony function.

The sets of preferences can comprise any user configurable parameter associated with a communication device. For example, the preferences can include a one or more of the following: ring volume level, ring tone, speaker volume level, microphone volume level, selected telephony functions for one or more keys, ring duration and frequency, speed dial information, and call log.

The telephony function can include any communication capability of the communication device. For example, the telephony function can include receiving an incoming contact, making a long distance and/or local call, accessing voice mail, accessing email, altering a configurable parameter of the communication device, and the like.

The determining step can be performed in a number of different ways, such as by tactile input into the communication device, a proximity sensor/detector in the communication device and an emitter (such as a transmitter or transponder) carried by the subscriber, a credential-containing card that is input into a card reader, a biometrics sensor, IR emitter, and the like.

The determining step can include authentication of credentials received from a subscriber and forwarding of a certificate to the communication device, if the authentication step is successfully completed.

The present invention can have a number of advantages over conventional systems. First, the strong authentication provided by the present invention can provide increased levels of network security and compliance of circuit-switched telecommunication systems with security protocols, such as the 802.1X protocol. Second, the ability to register a plurality of subscribers concurrently with the same communication device can provide more effective tracking of subscriber presence, greater use of communication devices, and an increased quality of service and greater convenience to subscribers and nonsubscribers (e.g., contactors of subscribers). This is particular true for proximity detection, which can require no tactile input from a subscriber to effect authentication of the subscriber to a particular communication device.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
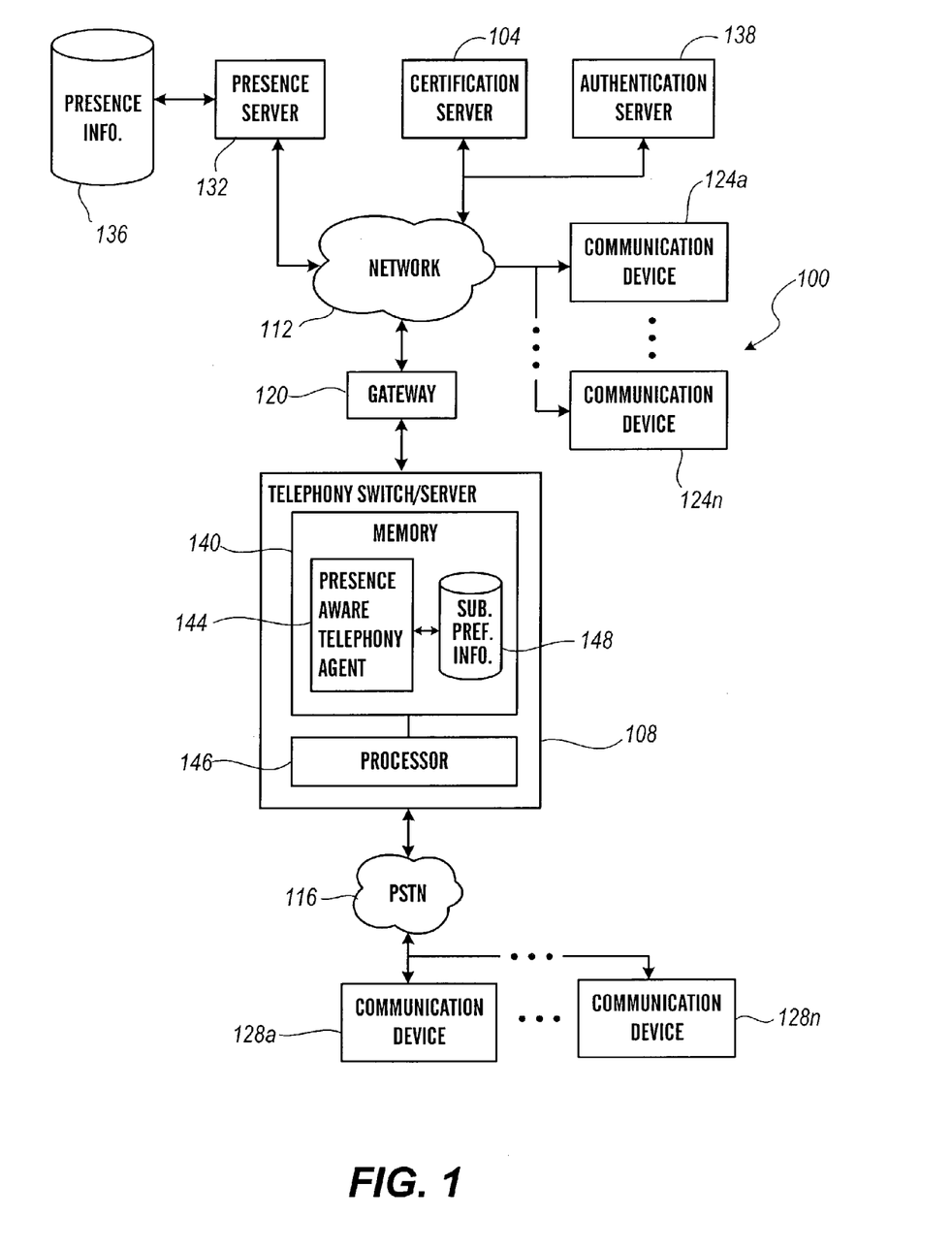
FIG. 1 is a block diagram of a network architecture according to a first embodiment of the present invention.

FIG. 1 depicts a presence aware communication network according to a first architecture of the present invention. The presence aware communication network 100 comprises a certification server 104 for receiving and storing certificates, such as digital certificates, and performing validation based on certificates, a telephony switch/server 108 for directing incoming and outgoing contacts, a packet-switched network 112, a circuit-switched Public Switched Telephone Network or PSTN 116, a gateway 120 for signal conversion, a first plurality of communication devices 124a–n in communication with the network 112, a second plurality of communication devices 128a–n in communication with PSTN 116, a presence server 132 and associated presence information database 136 for providing presence information about one or more users of the various communication devices, and an authentication server 138 for receiving and storing credentials and verifying identities of subscribers. As will be appreciated, certification server 104, telephony switch/server 108, gateway 120, presence server 132, and authentication server 138 can be implemented in software and/or hardware, depending on the application and the certification and authentication servers can be combined and implemented as a single server, depending on the desired system configuration.

The telephony switch/media server 108 can be any architecture for directing contacts to one or more communication devices. Illustratively, the switch/server 108 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; or Nortel Networks' IPConnect™. The switch or media server 108 typically is a stored-program-controlled system that conventionally includes interfaces to external communication links, a communications switching fabric, service circuits (e.g., tone generators, announcement circuits, etc.), memory 140 for storing control programs and data, and a processor 146 (i.e., a computer) for executing the stored control programs to control the interfaces and the fabric and to provide automatic contact-distribution functionality. The switch/server 108 comprises a network interface card to provide services to the first plurality of communication devices 124a–n. Included in the memory 140 is a presence aware telephony agent 144 to interact with the presence server 132 when handling communications directed to a communication device and a subscriber preference database 148 for containing communication device configuration information (or a set of pre-selected preferences) associated with each subscriber. The configuration information typically includes configuration information corresponding to each different type of communication device associated with the subscriber. As will be appreciated, such information alternatively can be stored in the presence information database 136.

The packet-switched network 112 can be any data and/or distributed processing network, such as the Internet. The network 112 typically includes proxies, registrars, and routers for managing packet flows.

The gateway 120 provides signal conversion capabilities between the circuit-switched PSTN 116 or some other type of circuit-switched network and the packet-switched network 112. For example, the gateway 120 can convert a packet-switched signal to a circuit-switched signal and vice versa.

The first and second plurality of communication devices 124a–n and 128a–n can be any communication device suitable for the network to which they are connected. The first plurality of communication devices 124a–n are connected to the packet-switched network 112 and can include, for example, IP hardphones such as the Cisco 7960™ phone, IP softphones, Personal Digital Assistants or PDAs, Personal Computers or PCs, laptops, and cellular phones. The second plurality of communication devices 128a–n are connected to the circuit-switched network 116 and can include, for example, wired and wireless telephones, PDAs, pagers, facsimile machines, modems, and cellular phones.

Figure 7:
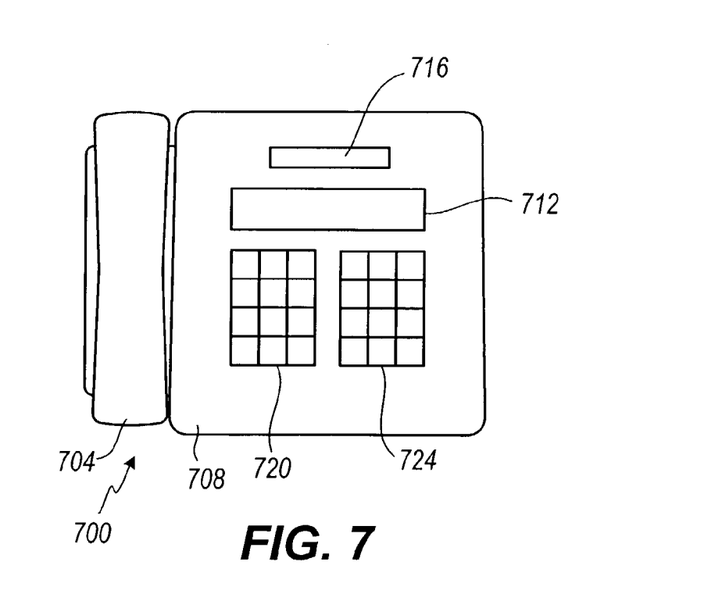
FIG. 7 depicts a telephone according to a seventh embodiment.

A typical communication device is depicted in FIG. 7. The device 700 comprises a removable handset 704 and a cradle assembly 708. The cradle assembly 708 comprises a display 712, a card reader 716 (into which the card is inserted or swiped), nonprogrammable or hard keypad 720, and programmable or soft keypad 724.

The presence server 132 collects presence information about a communication device and/or user thereof and stores the collected information in the presence information database 136. The presence server 132 provides the collected information to other network entities in response to queries. The presence server 132 can collect only information respecting the user's interaction with the various entities of FIG. 1 and/or other information provided directly or indirectly by the user. For example, the presence server 132 can interact with a presence service (not shown) that continually collects and redistributes availability data from publishing sources authorized by the user.

As used herein, "presence information" means any information associated with a network node and/or endpoint device, such as a communication device, that is in turn associated with a person. Examples of presence information include registration information, information regarding the accessibility of the endpoint device, the endpoint's telephone number or address, the recency of use of the endpoint device by the person, recency of authentication by the person to a network component, and the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact types and/or subjects such as subjects about which the person does wish to be contacted). Presence information can be user configurable, i.e., the user or subscriber can configure the number and type of communications and message devices with which they can be accessed to define different profiles that define the communications and messaging options presented to incoming contactors in specified factual situations. By identifying predefined facts, the system can retrieve and follow the appropriate profile. "Contact" means a connection or request for connection between two or more communication devices. The contact can be, for example, a telephone call, a chat session, a VoIP session, instant messaging, and facsimile transmission.

The certification server 104 and authentication server 138 can be implemented in any suitable manner. In one configuration, the servers access databases compatible with the Lightweight Directory Access Protocol or LDAP, the Remote Access Dial User Service or RADIUS protocol, and Microsoft Domain Controller™. Although the certification and authentication functions are depicted as being performed by a server (such as an LDAP server), it is to be understood that one or both of the functions can be performed by a component located elsewhere on the network 100, such as in the switch/server 108.

In a preferred configuration, the certification server 104, authentication server 138, telephony switch/media server 108, network 112, gateway 120, first plurality of communication devices 124a–n, presence server 132, and presence information database 136 are SIP compatible and can include interfaces for various other protocols such as the Lightweight Directory Access Protocol or LDAP, Simple Mail Transfer Protocol or SMTP, and Internet Message Access Protocol or IMAP4.

Figure 5:
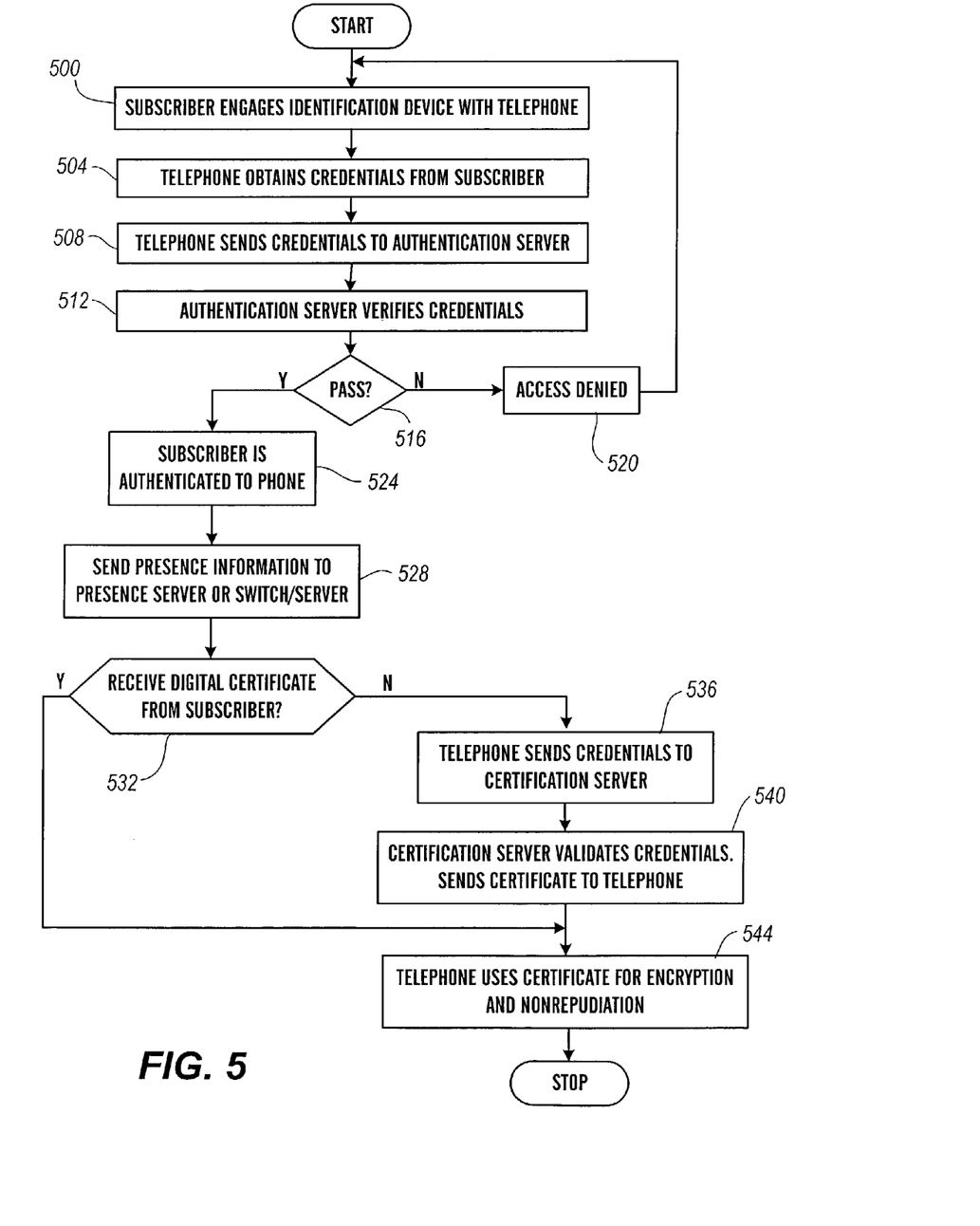
FIG. 5 is an overall operational flowchart of various computational components of the presence aware communications network according to a fifth embodiment.

The method for performing authentication of subscribers associated with communication devices 128a–n (e.g., digital telephones) and 124a–n (e.g., IP hard phones) will now be described with reference to FIG. 5.

In step 500, the subscriber inputs credentials into the communication device. This may be done in any suitable manner for the type of credentials being entered, such as by scanning a body part for biometric information, manually inputting a code or sequence of characters, swiping a card (such as smart card, a card containing a magnetic loop, a Universal Serial Bus or USB, FOB, a dongle, a bar code, and a magnetic strip similar to that used in credit cards, through a reader, transmitting and receiving an encrypted or unencrypted wireless signal (such as an infrared signal, a radio frequency signal, and the like) from a transmitter to a receiver on the communication device, inserting a USB token and the like. In one configuration, the credentials are inputted into the communication device by swiping the card through the reader and removing the card immediately from the reader after the swipe.

As set forth in U.S. patent application, Ser. No. 10/385,817, entitled "Method and Apparatus for Controlling Data and Software Access", to Walker, filed on Mar. 10, 2003, which is incorporated by reference herein, the credentials can be inputted into the communication device wirelessly by a wireless proximity detection or sensor system. The detection system includes the communication device, an antenna and transceiver for transmitting detection signals and/or receiving credential-containing signals from a credential-containing device carried by the subscriber. The credential-containing device or token carried by the subscriber also includes an antenna and transceiver for broadcasting an encrypted credential-containing signal. The token can be configured as a card, a badge, a pager-type device, a PDA, and the like. When the credential-containing device is within a predefined radius of the detection system, the detection system receives the credential-containing information wirelessly. Depending on the desired configuration, the detection system can be implemented to only receive (and not transmit) signals and the credential-containing device to only transmit (and not receive) signals at predetermined time intervals. The credential-containing device can also be configured as a transponder that uses energy from the signal received from the detection system to power circuitry and transmit a return signal.

The credentials typically include a unique user or subscriber identifier (e.g., handle, employee ID number, username, etc.) and a digital certificate (or such other medium that assures the authenticity of the user such as fingerprint identification, retinal scans, etc.).

In step 504, the communication device verifies that it has successfully obtained the credentials from the subscriber. Step 504 is repeated until a successful transfer is effected.

In step 508, the communication device sends the received credentials to the authentication server 138 or to the switch/server 108 for forwarding to the server 138.

In step 512, the authentication server 138 retrieves stored credentials associated with the subscriber from an authentication database (not shown) and verifies that the received credentials are identical to the stored credentials. The credentials typically compared by the server 138 are the user's unique identification information (e.g., name, PIN, extension, password, etc.). If the stored and received credentials are identical, the credentials are successfully verified. If not, the credentials are unverified. The server 138 sends an appropriate response (fail or pass) to the device or to the switch/server 108.

In decision diamond 516, the device (and/or the switch/server 108) determines whether or not the response contains a pass or fail. When the response contains a fail, access is denied to the subscriber in step 520, such as by providing to the subscriber a verbal and/or graphic message, and the network 100 waits for the subscriber to repeat step 500. When the response contains a pass, the device (and/or switch/server) proceeds to step 524.

In step 524, the network components treat the subscriber as being successfully authenticated to the network 100. In step 528, the device (and/or switch/server) generates and sends a signal to the presence server 132 containing presence information associated with the subscriber. The server 132 then saves the information in the presence information database 136. Successful authentication can trigger the agent 144 sending authorization to the communication device for activation of certain (telephony) features, such as long distance access, voice mail access, etc.

The device (and/or switch/server) next proceeds to decision diamond 532 and determines whether the digital certificate is included in the credentials received from the subscriber.

When the credentials received from the subscriber do not include the digital certificate, the device (and/or switch/server), in step 536 forwards the received credentials to the certification server 104. In response in step 540, the certification server 104 retrieves stored credentials and validates the stored credentials against the received credentials. When validation is successful, the server 104 forwards the certificate to the device (and/or switch/server). When validation is unsuccessful, the server 104 notifies the device (and/or switch/server), which in turn notifies the subscriber that authentication has failed and access to the certificate is denied.

When the credentials received from the subscriber include the digital certificate or after the successful validation of the credentials by the certification server 104 in step 540, the device (and/or switch/server) proceeds to step 544. In step 544, the device uses the certificate for encryption (either media or signaling encryption) and nonrepudiation in communications with communication devices associated with other users.

The ability to perform authentication and certification at a communication device can provide a basis for a more versatile telecommunications network. An example of a network having this increased versatility will be described with reference to FIGS. 2–4. Generally, a plurality of subscribers are able to be registered with a common communication device at the same time. The specific configuration preferences of each subscriber for that type of communication device can be enabled selectively for that communication device when the corresponding subscriber wishes to use the device for placing or receiving a contact.

Figure 2:
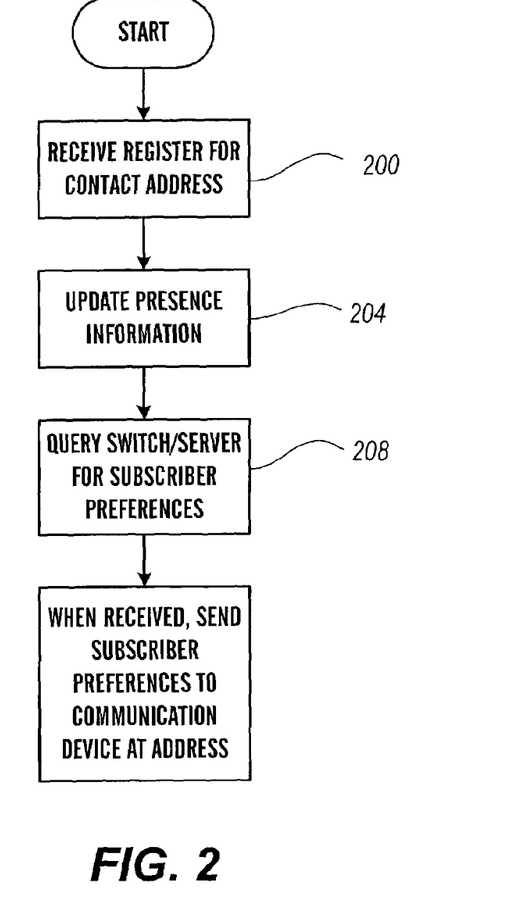
FIG. 2 is an operational flowchart of the presence server according to a second embodiment.

Referring to FIG. 2, the presence server 132 in step 200 receives a register message or notification relating to the availability of a communication device associated with a first subscriber. "Availability" refers to the accessibility of a communication device through a selected communication medium. For example, a communication device can be deemed to be available when the communication device has an unexpired registered address, when the subscriber used the communication device recently (i.e., within a predetermined time period), and when the subscriber has enabled the device for use recently. This message may be sent only after the subscriber is successfully authenticated by the network as noted above.

In step 204, the server 132 updates presence information stored in the presence information database 136 to reflect that the first subscriber is now associated with the communication device.

In step 208, the server 132 queries the switch/server 108 for the preferences (or configuration information) for the first subscriber for the type of communication device in which the registered communication device is categorized (e.g., specific model of digital phone, IP softphone, IP hardphone, PDA, and the like). Configuration information includes, for example, ring volume level, speaker volume level, setting or content of soft or programmable keys, speed dials, button layouts, ring duration and frequency, ring tone, button labels, and disability settings (e.g., TTY or spoken display settings). Alternatively, the configuration information can be stored in the presence information database 136.

In step 212, when the preferences are received, the presence server 132 forwards the preferences to the registered communication device. The device stores the preferences for later use. Alternatively, the preferences can be retrieved and forwarded to the registered communication device by the switch/server.

The communication device can have multiple sets of subscriber preferences stored for a corresponding number of subscribers. The sets of subscriber preferences can contain different information, such as different settings and different soft key programming. Thus, more than one subscriber can be registered with the presence server 132 for the same communication device at the same time. When one of the registered subscribers seeks to use the device, the device performs the authentication operation depicted in FIG. 5 (if not already done), and, based on the subscriber identity successfully validated by the network 100, loads and enables the corresponding preferences for the subscriber.

Figure 4:
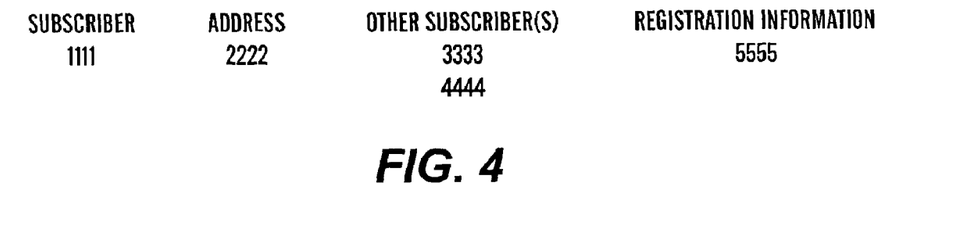
FIG. 4 depicts the data structures in the presence information database according to a fourth embodiment.

The data structures in the subscriber location table (stored in the presence information database 136) that enable concurrent registration are depicted in FIG. 4. The line entry in the table is for the subscriber having identification code or credential 1111. The currently registered communication device address for subscriber 1111 is 2222. Two other subscribers concurrently registered with the communication device having address 2222 have identification codes or credentials 3333 and 4444. Other registration information (e.g., codec information, speed dials, and ring tone) corresponding to the first subscriber is denoted by 5555.

As will be appreciated, when one of the concurrently registered subscribers wishes to perform a telephony function, such as placing a call, and checking voice mail on the communication device having address 2222 the communication device can query the subscriber (such as an audio and/or visual query followed by a tactile or audio response from the subscriber) to determine which subscriber is attempting to perform the function. In response to the subscriber response, the communication device can reconfigure itself according to the identified subscriber's preferences prior to permitting the subscriber to perform the function.

Figure 3:
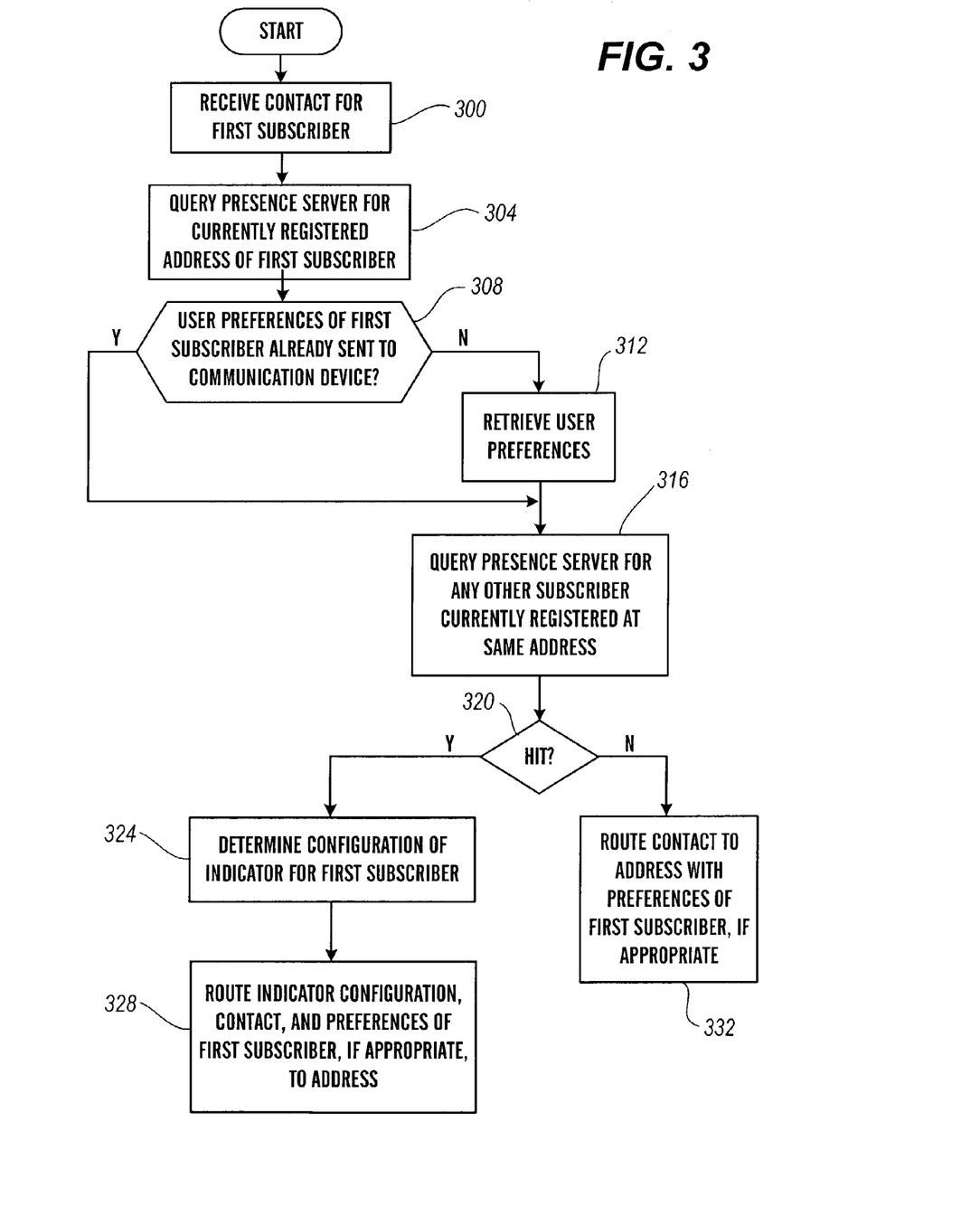
FIG. 3 is an operational flowchart of the switch/server according to a third embodiment.

Another embodiment of the network for handling an incoming contact for a subscriber concurrently registered with other subscribers on a common communication device will now be described with reference to FIG. 3.

In step 300, the switch/server 108 receives a contact for a first subscriber. The presence aware telephony agent 144 in the switch/server 108 in step 304 queries the presence server 132 for the currently registered communication device address for the first subscriber. In response, the presence server 132 access the database 136 and retrieves the requested address. The server 132 forwards the address to the switch/server.

In decision diamond 308, the presence aware telephony agent 144 accesses the subscriber preferences information database 148 to determine if the first subscriber's preferences for the communication device address have previously been forwarded to that address within a predetermined time period (which is a function of the memory size and/or data aging policies being implemented). If the preferences have not previously been forwarded within the predetermined time period, the agent 144 in step 312 proceeds with forwarding the preferences to the address. If the preferences have been previously forwarded within the predetermined time or after step 312 is completed, the agent 144 queries the presence server 132 in step 316 as to whether any other subscriber is currently registered at the same address. The presence server 132 accesses the first subscriber's information in the presence information database 136 and sends an appropriate response.

In decision diamond 320, the agent 144 determines whether there is a "hit" (meaning that there is another subscriber concurrently registered at the same address) or a "no hit" (meaning that there is not another subscriber concurrently registered at the same address). As will be appreciated, the aforementioned associations can be reversed depending on the configuration.

If there is a "hit", the agent 144 in step 324 determines the configuration of the indicator associated with the first subscriber. The indicator is used by the communication device to indicate that the incoming contact is intended for the first subscriber (or a particular subscriber). The indicator can be pre-selected or pre-configured by the first subscriber or selected by the agent 144. For example, the indicator can be a particular ring length and frequency, a particular light illumination length and frequency, illumination of a particular light color or light in a specific location, a particular display on the digital display of the device, a broadcast audio announcement through the device's speaker, a graphical representation, such as a color change, on a graphical user interface and the like. In one configuration, one ring length and frequency (that is different from that used for a device concurrently registered to only one subscriber) is used to indicate that an incoming contact is intended for only one of the concurrently registered subscribers and a message announcement is displayed on the phone's display providing the identity of the subscriber to whom the contact is directed (e.g., the name, address (telephone number or extension), and/or other identifier of the subscriber). The same type of graphical input can be provided that is provided for caller id except that the intended recipient of the contact is the subject of the displayed identification information. In any event, in step 328 the indicator configuration, contact, and, if appropriate, preferences of the first subscriber are directed or routed to the registered address of the first subscriber. As will be appreciated, the pre-selected preferences of the first subscriber can include the indicator configuration.

If there is a "no hit", the agent 144 in step 332 routes the contact and, if appropriate, the preferences of the first subscriber to the registered address.

In yet a further embodiment, the remote authentication permits a presence aware network 100 to stalk, follow, or track a subscriber. As the subscriber moves past detection systems within the predefined radius or range of the credential-containing transmission device, the presence aware server is notified via registration (or notification) messages of the location of the subscriber (or availability of communication devices associated with the subscriber). The temporally registered address associated with the first subscriber thus automatically changes or is updated as the subscriber moves from one location to another.

Figure 6:
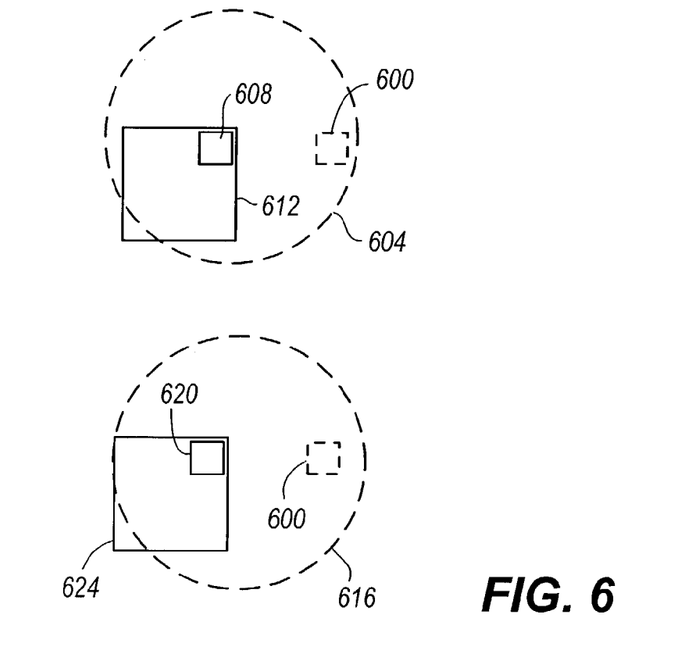
FIG. 6 depicts a sixth operational embodiment.

FIG. 6 depicts an operational example of this embodiment. At a first time interval, a credential-containing device 600 carried by a first subscriber is at a first (spatial) location. The first location is within a first redefined range 604 of a first detection system 608 associated with a first communication device 612. At the first time interval, the presence server 132 updates the presence information in database 136 so that the address of the first communication device 612 is the currently registered address for the first subscriber. At a second, later time interval, the credential-containing device 600 is carried by the first subscriber from the first location to a second, different location. The second location is within a second predefined range 616 of a second detection system 620 associated with a different second communications device 624. At the second time interval, the presence server 132 updates the presence information in database 136 so that the address of the second and not the first communication device is the currently registered address for the first subscriber.

Using the above example, if an incoming contact for the first subscriber is received by the switch/server 108 during the first time interval the presence server 132 directs the switch/server to route the contact to the first communication device 612. If the first subscriber, for some reason, does not accept the contact at the first communication device and moves to the second location during the second later time interval, the presence server automatically updates the presence information in database 136 and either directly notifies or responds to a query from the agent 144 that the first subscriber is now at the second communication device. The agent 144 causes the contact to be transferred by known techniques from the first communication device to the second communication device. The transfer is seamless to the contactor. This automated approach is much more accurate than the conventionally used predefined set of rules regarding a sequential ordering of contact addresses to use in an attempt to contact a subscriber.

A number of variations and modifications of the invention can be used. It would be possible to provide for some features of the invention without providing others.

For example in one alternative embodiment, the various components or modules can be implemented as hardware or software or a combination thereof and can be implemented in different ways. For example, the steps noted above for each module can be performed by other modules, depending on the application.

In another alternative embodiment, protocols other than those discussed above can be used with one or more of the above embodiments. For example, protocols that can be used in addition to or in lieu of SIP include H.323, SCCP, and H.248.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for serving a plurality of communication devices associated with a plurality of subscribers, comprising:
   determining that at least first and second subscribers are in the vicinity of a selected communication device at least once during a defined time interval; and
   configuring the selected communication device according to a first set of preferences associated with the first subscriber before the first subscriber causes the selected communication device to perform a telephony function and according to a second set of preferences associated with the second subscriber before the second subscriber causes the selected communication device to perform the telephony function, wherein the first and second sets of preferences are different from one another.

2. The method of claim 1, wherein the device has the first and second sets of preferences in memory at the same time, wherein the determining step is performed when each of the at least first and second subscribers is within a selected spatial range of the selected communication device, and wherein the determining step comprises:
   receiving first and second sets of credentials, respectively, from the first and second subscribers;
   authenticating each of the first and second sets of credentials;
   when a set of credentials is successfully authenticated, permitting the corresponding subscriber to perform a telephony operation with the selected communication device; and
   when a set of credentials is not successfully authenticated, not permitting the corresponding subscriber to perform the telephony operation with the selected communication device.

3. The method of claim 2, wherein in the receiving step at least one of the first and second sets of credentials is received by means of a wireless signal, wherein the first and second sets of preferences are stored in a presence database, and wherein each of the first and second sets of preferences corresponds to a plurality of communication devices of different types.

4. The method of claim 2, wherein in the receiving step at least one of the first and second sets of credentials is received by means of a card reader and further comprising before the configuring step:
   the selected communication device identifying which of the first and second subscribers is attempting to perform a telephony function, wherein the configuring step is performed using the set of preferences corresponding to the identified subscriber.

5. The method of claim 1, wherein the first and second sets of preferences each comprise a plurality of the following: ring volume level, ring tone, speaker volume level, microphone volume level, a selected telephony function associated with one or more keys, ring duration and frequency, speed dial information, handicap accessibility, and call logs and further comprising:
   in response to the determining step, a switch and/or server providing the first and second sets of preferences corresponding to the first and second subscribers to the selected communication device during the defined time interval.

6. The method of claim 1, wherein the configuring step comprises:
   querying at least one of the first and second subscribers for an associated identity in response a request from the at least one of the first and second subscriber to perform the telephony function; and
   configuring the selected communication device in accordance with the set of preferences associated with the identity received in response to the query.

7. The method of claim 1, wherein the telephony function is receiving an incoming contact destined for one of the first and second subscribers and, in the configuring step, the selected communication device is configured to present an indicator to the first and second subscribers to indicate the identity of the intended recipient of the incoming contact.

8. The method of claim 7, wherein the indicator is one or more of illumination of a selected light, illumination of a selected color of light, a display of a text message, a distinctive ring length and/or frequency, a particular light illumination length and/or frequency, a voice announcement, and a graphical representation on a graphical user interface.

9. A computer readable medium for performing the steps of claim 1.

10. The method of claim 1, wherein the selected communication device performs interpersonal communications between two parties and wherein, during the defined time interval, the first and second subscribers are registered concurrently with the selected communication device.

11. The method of claim 8, wherein a ring length and frequency (that is different from that used for a device concurrently registered to only one subscriber) is used to indicate that an incoming contact is intended for only one of the first and second subscribers and a message announcement is displayed on the device's display providing the identity of the subscriber to whom the contact is directed.

12. The method of claim 1, wherein, during the course of an incoming call, the incoming call is being rung at the selected communication device and wherein the first subscriber moves out of the spatial vicinity of the selected communication device and into the spatial vicinity of a second communication device and further comprising:
   when the first subscriber moves out of range of the selected communication device, no longer ringing the incoming call at the selected communication device; and
   when the first subscriber moves into range of the second communication device, thereafter ringing the incoming call at the second communication device.

13. A method for routing an incoming contact, comprising:
   (a) receiving a first wireless signal at a first communication device, the first wireless signal being emitted by a first emitter carried by a first subscriber and comprising a first set of credentials associated with the first subscriber;
   (b) authenticating the first set of credentials;

(c) when the authentication of the first set of credentials is successful, granting access to a telephony function of the first communication device;

(d) when the authentication of the first set of credentials is unsuccessful, denying access to the telephony function of the first communication device;

(e) receiving an incoming contact for the first subscriber:

(f) directing the incoming contact to the first communication device;

(g) thereafter receiving a second wireless signal from the first emitter at a second communication device, the first and second communication devices being geographically dislocated from one another: and (h) transferring the incoming contact from the first communication device to the second communication device.

14. The method of claim 13, wherein the first communication device performs interpersonal communications between two parties.

15. The method of claim 13, further comprising:

(i) receiving a second wireless signal at a first communication device, the second wireless signal being emitted by a second emitter carried by a second subscriber and comprising a second set of credentials associated with the second subscriber;

(j) authenticating the second set of credentials;

(k) when the authentication of the second set of credentials is successful, granting access to the telephony function of the first communication device; and (l) when the authentication of the second set of credentials is unsuccessful, denying access to the telephony function of the second communication device, wherein, when the first and second sets of credentials are authenticated successfully, the first and second subscribers are registered concurrently with the first communication device.

16. The method of claim 15, further comprising:

(m) providing first and second sets of preferences corresponding to the first and second subscribers to the first communication device during the defined time interval, the first and second sets of preferences being different from one another; and (n) configuring the first communication device according to the first set of preferences when the first subscriber performs a telephony function and according to the second set of preferences when the second subscriber performs the telephony function.

17. The method of claim 16, wherein the first and second sets of preferences each comprise a plurality of the following: ring volume level, ring tone, speaker volume level, microphone volume level, a selected telephony function associated with one or more keys, ring duration and frequency, and disability settings and wherein the first communication device has in memory simultaneously both the first and second sets of preferences.

18. The method of claim 16, wherein the first and second sets of preferences each comprise a plurality of the following: ring volume level, ring tone, speaker volume level, microphone volume level, a selected telephony function associated with one or more keys, ring duration and frequency, and disability settings and wherein the first communication device has in memory simultaneously both the first and second sets of preferences.

19. A presence aware network, comprising:

a plurality of communication devices connected to the network and associated with the plurality of subscribers;

a presence server operable to access presence information associated with a plurality of network subscribers and/or communication devices associated therewith; and a subscriber location table listing available communication devices, including, for a selected one of the listed communication devices, a listing of two or more subscribers concurrently registered with the selected communication device, wherein, when an incoming call is received for any one of the two or more listed subscribers, the incoming contact is forwarded to the selected one communication device.

20. The presence aware network of claim 19, wherein the selected communication device performs interpersonal communications between two parties and wherein the subscriber location table is stored in a presence information database associated with the presence server.

21. The presence aware network of claim 19, wherein a first portion of the network is packet-switched and a second portion of the network is circuit-switched and further comprising:

a gateway operable to provide signal conversion between the first and second portions of the network; and at least one of a telephony switch and server for directing contacts to the plurality of communication devices, wherein the incoming call is being rung at the selected communication device, wherein the first subscriber moves out of the spatial vicinity of the selected communication device and into the spatial vicinity of a second communication device, wherein, when the first subscriber moves out of range of the selected communication device, the incoming call is no longer rung at the selected communication device, and wherein, when the first subscriber moves into range of the second communication device, the incoming call is thereafter rung at the second communication device.

22. The presence aware network of claim 21, wherein the subscriber location table is stored in memory of the at least one of a telephony switch and server and wherein the selected communication device concurrently contains, in memory, a set of user preferences for each of the two or more subscribers, the sets of user preferences for each of the two or more subscribers being different from one another.

23. A presence aware network, comprising:

a plurality of communication devices, at least one of the communication devices being simultaneously associated with at least first and second subscribers, the at least one communication device being operable to be configured according to a first set of preferences associated with a first subscriber, when the first subscriber performs a telephony function on the at least one of the communication devices and according to a second set of preferences when a second subscriber performs the telephony function on the at least one of the communication devices, wherein the first and second sets of preferences are different from one another.

24. The presence aware network of claim 23, wherein each communication device comprises a proximity detector operable to determine that at least first and second subscribers are in a predetermined range of a selected communication device at least once during a defined time interval, wherein the first and sets of preferences are simultaneously contained in the memory of the at least one of the communication devices, and wherein each of the first and second subscribers are registered concurrently with the at least one of the communication devices.

25. The presence aware network of claim 24, further comprising a presence aware telephony agent operable to provide the first and second sets of preferences corresponding to the first and second subscribers to the communication device during a defined time interval.

26. The presence aware network of claim 24, wherein each proximity detector is operable to receive a set of credentials from an emitter carried by a subscriber and further comprising:
  an authentication server operable to authenticate the received set of credentials.

27. The presence aware network of claim 26, wherein a communication device associated with the proximity detector is operable to permit the corresponding subscriber to perform a telephony operation with the communication device, when the received set of credentials is successfully authenticated, and not permit the corresponding subscriber to perform the telephony operation with the communication device, when the received set of credentials is not successfully authenticated and further comprising:
  a certification server operable to provide a certificate to a communication device when an associated subscriber is successfully authenticated by the authentication server.

28. The presence aware network of claim 26, wherein the first and second sets of preferences each comprise a plurality of the following: ring volume level, ring tone, speaker volume level, microphone volume level, a selected telephony function associated with one or more keys, and ring duration and frequency, wherein the at least one of the communication devices is configured automatically for the first set of preferences when the first subscriber, after successful authentication, provides a first identifier to the at least one of the communication devices and wherein the at least one of the communication devices is configured automatically for the second set of preferences when the second subscriber, after successful authentication, provides a second identifier to the at least one of the communication devices.

29. The presence aware network of claim 23, wherein the at least one of the communication devices is operable to query at least one of the first and second subscriber for an associated identity in response to a request from the at least one of the first and second subscriber to perform the telephony function and configure the selected communication device in accordance with the set of preferences associated with the identity received in response to the query.

30. The presence aware network of claim 23, wherein the telephony function is receiving an incoming contact and the at least one of the communication devices is configurable to present a first indicator to the first subscriber and a different second indicator to the second subscriber, the indicator being indicative of an intended recipient of the incoming contact.

31. The presence aware network of claim 30, wherein the selected communication device performs interpersonal communications between two parties and wherein the indicator is one or more of illumination of a selected light, illumination of a selected color of light, a display of a text message, a distinctive ring length and/or frequency, a particular light illumination length and/or frequency, a voice announcement, and a graphical representation on a graphical user interface.

32. A method for routing an incoming contact, comprising:
  (a) receiving a first wireless signal at a first communication device, the first wireless signal being emitted by a first emitter carried by a first subscriber and comprising a first set of credentials associated with the first subscriber;
  (b) authenticating the first set of credentials;
  (c) when the authentication of the first set of credentials is successful, granting access to a telephony function of the first communication device;
  (d) when the authentication of the first set of credentials is unsuccessful, denying access to the telephony function of the first communication device
  (e) receiving a second wireless signal at a first communication device, the second wireless signal being emitted by a second emitter carried by a second subscriber and comprising a second set of credentials associated with the second subscriber;
  (f) authenticating the second set of credentials;
  (g) when the authentication of the second set of credentials is successful, granting access to the telephony function of the first communication device; and
  (h) when the authentication of the second set of credentials is unsuccessful, denying access to the telephony function of the second communication device;
  (i) providing first and second sets of preferences corresponding to the first and second subscribers to the first communication device during the defined time interval, the first and second sets of preferences being different from one another; and
  (j) configuring the first communication device according to the first set of preferences when the first subscriber performs a telephony function and according to the second set of preferences when the second subscriber performs the telephony function.

* * * * *